United States Patent
Sachs et al.

(10) Patent No.: US 8,666,968 B2
(45) Date of Patent: Mar. 4, 2014

(54) EXECUTING RUNTIME CALLBACK FUNCTIONS

(75) Inventors: Nadine Sachs, Wiesloch (DE);
Sebastian Schroetel, Heidelberg (DE);
Ulrich Bestfleisch, Schwetzingen (DE);
Gerrit Simon Kazmaier, Heidelberg (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/335,937

(22) Filed: Dec. 23, 2011

(65) Prior Publication Data
US 2013/0166496 A1    Jun. 27, 2013

(51) Int. Cl.
*G06F 7/00* (2006.01)

(52) U.S. Cl.
USPC .......... 707/713; 707/718; 707/769; 705/7.25; 705/348; 709/246; 717/100; 717/136; 717/140; 717/219

(58) Field of Classification Search
None
See application file for complete search history.

(56) References Cited

U.S. PATENT DOCUMENTS

| | | | | |
|---|---|---|---|---|
| 7,571,192 B2* | 8/2009 | Gupta et al. | .......................... | 1/1 |
| 7,707,143 B2* | 4/2010 | Bruce et al. | ............ | 707/999.003 |
| 7,945,575 B2* | 5/2011 | Cushing et al. | ............... | 707/760 |
| 2004/0139061 A1* | 7/2004 | Colossi et al. | .................... | 707/3 |
| 2005/0159995 A1* | 7/2005 | Woehler | .......................... | 705/10 |
| 2006/0149778 A1* | 7/2006 | Clover | .......................... | 707/102 |
| 2007/0078823 A1* | 4/2007 | Ravindran et al. | ................ | 707/3 |
| 2007/0193645 A1* | 8/2007 | Mohr | ................. | 141/1 |
| 2011/0035353 A1* | 2/2011 | Bailey | .......................... | 707/602 |

* cited by examiner

*Primary Examiner* — Fred I Ehichioya
*Assistant Examiner* — Hasanul Mobin

(57) ABSTRACT

In an embodiment, a runtime callback function is a part of a code that is invoked upon execution of an associated function. To execute the runtime callback function associated with an in-memory computing engine, multidimensional analytical metadata associated with an application server is received and transformed into an in-memory executable metadata, to generate an instance of an in-memory executable calculation scenario. The instance of the in-memory executable calculation scenario is analyzed to determine process callbacks associated with nodes of the in-memory executable calculation scenario. Based upon the determined process callbacks, the runtime callback function is executed by executing a selection callback at the nodes and a transformation callback at part providers associated with the in-memory executable calculation scenario.

20 Claims, 6 Drawing Sheets

EXECUTING RUNTIME CALLBACK FUNCTIONS

RELATED APPLICATIONS

This application is related to three co-pending U.S. Applications—
1. U.S. application Ser. No. 13/335,935 titled 'GENERATING A COMPILER INFRASTRUCTURE', filed on Dec. 23, 2011;
2. U.S. application Ser. No. 13/335,938 titled 'DYNAMIC RECREATION OF MULTIDIMENSIONAL ANALYTICAL DATA', filed on Dec. 23, 2011; and
3. U.S. application Ser. No. 13/335,939 titled 'GENERATING A RUNTIME FRAMEWORK', filed on Dec. 23, 2011, all of which are herein incorporated by reference in its entirety for all purposes.

FIELD

The field generally relates to computer systems and software, and more particularly to various methods and systems to execute runtime callback functions.

BACKGROUND

Online Analytical Processing (OLAP) tools enable users to interactively analyze multidimensional data from various perspectives. Applications of OLAP include business reporting for sales, marketing, management reporting, business process management, budgeting and forecasting, financial reporting and the like. OLAP processors use data stored in in-memory databases for analytical processing. An in-memory database is a database management system that primarily relies on volatile memory for computer data storage. A plurality of data sources may be associated with such an in-memory database, and while executing corresponding data related to operations, one or more pointers may be encountered. The pointers are types of references that point (e.g., via an address) to a value or a function or any piece of code in a computer program. To complete the execution of the data related operations, executing the pointers may be required.

SUMMARY

Various embodiments of systems and methods to execute runtime callback functions are disclosed. In an embodiment, a runtime callback function is a part of code that is invoked upon execution of an associated function. To execute the runtime callback function associated with an in-memory computing engine, multidimensional analytical metadata associated with an application server is received and transformed into an in-memory executable metadata, to generate an instance of an in-memory executable calculation scenario. The instance of the in-memory executable calculation scenario is analyzed to determine process callbacks associated with nodes of the in-memory executable calculation scenario. The runtime callback function is executed by executing a selection callback at the nodes and a transformation callback at part providers associated with the in-memory executable calculation scenario.

In an embodiment, the selection callback of an application server is processed to derive an associated filter condition. The selection callback is executed in the application server at a system runtime to transform a resultant of the execution into an in-memory executable runtime callback function. The result is rendered in a placeholder of a secondary calculation node associated with an in-memory computing engine. Further, based upon a trigger to execute the runtime callback function on a primary calculation node, the in-memory computing engine pushes the filter condition to the primary calculation node to retrieve the resultant from the placeholder and to execute the runtime callback function.

In another embodiment, based upon a query executed in the in-memory computing engine, the multidimensional analytical metadata is analyzed to determine a combination type of a calculation pattern associated with the instance of the in-memory executable calculation scenario. A part provider associated with the combination type is determined to retrieve one or more subsets associated with the instance of the in-memory executable calculation scenario. The transformation callback is executed by processing the subsets associated with the part provider, to execute the runtime callback function.

In an embodiment, a system includes a processor to read and execute instructions stored in a memory element that is in communication with the processor. The memory includes instructions to execute the runtime callback function. The processor may be in communication with various compilation modules including a database, a runtime analyzer, a runtime execution engine, a metadata buffer and the like to execute the runtime callback function.

These and other benefits and features of embodiments will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Figure 1:
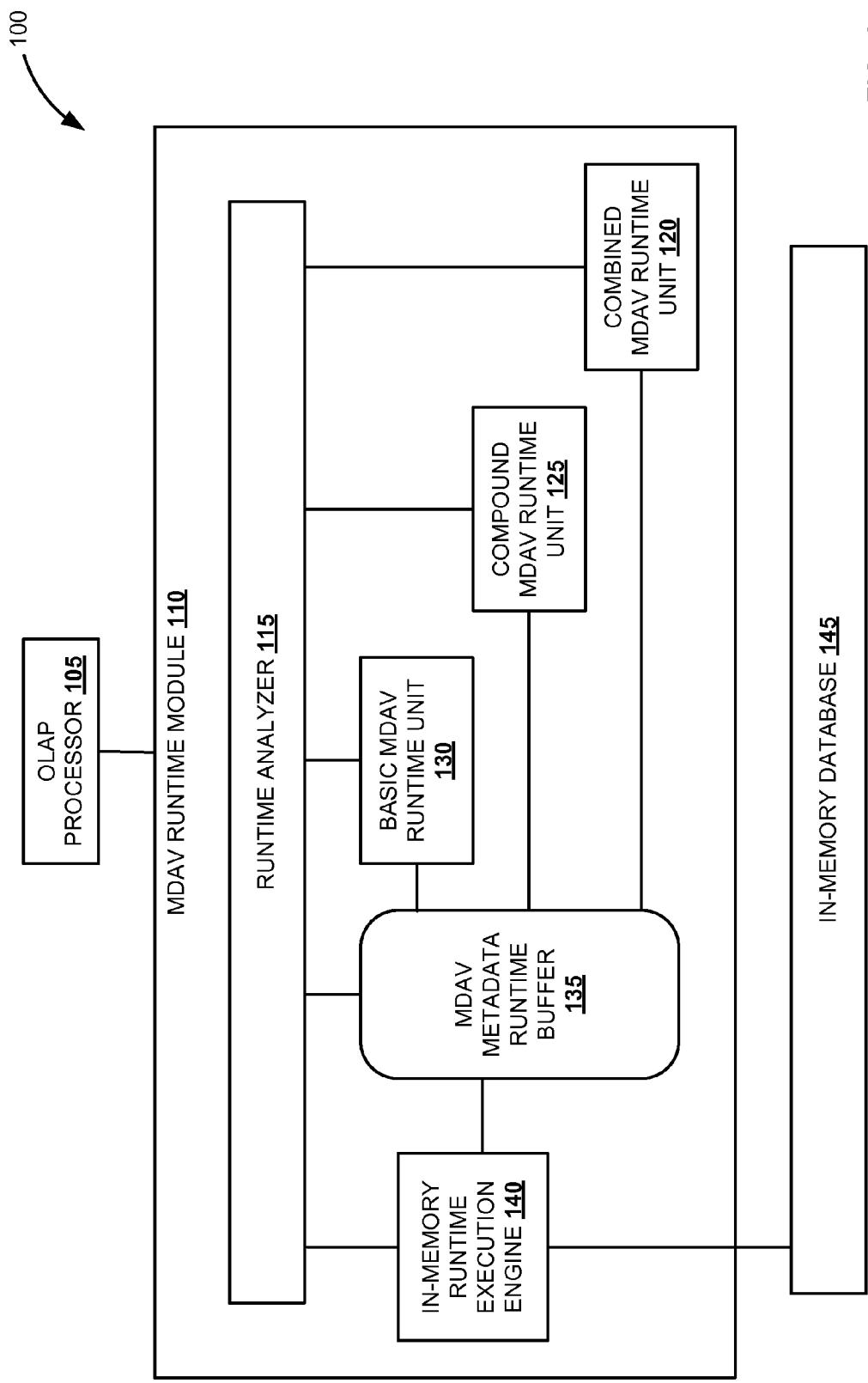
FIG. 1 is a block diagram illustrating an overall architecture of a system to execute a runtime callback function, according to an embodiment.

Embodiments of techniques for systems and methods to execute runtime callback functions are disclosed. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Business data warehouse of an enterprise is a repository of an enterprise's data where the data is standardized, structured, integrated, and managed. Metadata associated with the data warehouse defines contents of the data warehouse and the functioning of the data present in the data warehouse. Metadata of various traditional business data warehouses are replaced by multidimensional analytical views (MDAVs), which represent a business object based metadata model for analytics. The analytics include computer technology, operational research, and statistics to solve different problems in business and industry scenarios such as enterprise decision management, marketing analytics, portfolio analysis, credit risk analysis, and the like. Metadata associated with the MDAV (referred to as "MDAV metadata") may be stored in an in-memory computing engine.

The in-memory computing engine is a part of applications that are built using in-memory technology. In-memory technology is a database management technology that stores computer related data on main memory. Since the information is stored on main memory, processing of all data transactions are executed on main memory without having to access the external storage media, thereby reducing I/O reading activity when querying a database. The in-memory computing combines transactions and analytics to provide efficient storage, search and ad-hoc analysis of real-time information. In-memory analytics may be described as an approach to query data residing on the main memory, resulting in quick response time. In-memory computing applications are built based on business driven use cases, specifically in industries requiring processing of large data volumes or real-time processing such as banking, retail, utilities/energy, and telecommunications. Examples where in-memory technology may be applied to build business applications include: demand forecasting based on huge data volumes provided by smart meter devices in utilities industries; managing energy cost in energy intensive industries with in-memory analytics and forecasting based on fine grained consumption data; trade promotion management solutions for retailers and consumer products companies with high data volumes; real-time risk management and cumulated risks calculation for insurance companies in the corresponding area; internal and external risk management and regulatory reporting for banking sector; and the like.

In an embodiment, the in-memory computing engine is configured to execute the data stored in an in-memory database of a computing device. The execution of the data may render an outcome of a business application associated with the in-memory computing engine. The in-memory computing engine is associated with a runtime module accessed during a runtime execution of the data; and a compile time module accessed while compiling the computing engine. The in-memory computing engine includes a calculation engine to generate calculation patterns or calculation rules defined for the in-memory computing engine (e.g. data operations such as union, join, filtering temporal data, and so on); and to execute in-memory executable calculation scenarios representing a group of operations (e.g., mathematical operations). When the calculation patterns are executed by a calculation engine in the in-memory computing engine, a set of in-memory executable calculation scenarios are created. The result from the execution of the in-memory executable calculation scenarios is sent to an MDAV runtime module, which further forwards it to an OLAP processor. The calculation engine can work with multiple inputs from multiple table-types such as OLAP-views, JOIN-tables, physical-tables, and the like. The calculation engine can also combine and transform these table types in multiple ways, for example by using predefined operations like join, projection, aggregation, etc. Further, the calculation engine allows customizable operations by including Python-scripts, R-scripts, or L-scripts and thus allowing basically any kind of data transformation.

A runtime module is responsible to execute the MDAV metadata in runtime and further forward it to the OLAP processor for analytical processing. The runtime module receives data from various data sources, including resultant data from join operation, union operation, intersection operation, planning operation or the like. While executing the MDAV metadata in runtime, an associated processor may encounter a callback function, and invokes the execution of the callback function. In an embodiment, a runtime callback function is a part of a code that is invoked, upon execution of an associated function. The callback function may be encountered and invoked during the execution of the MDAV metadata or subsequent to the execution of the MDAV metadata based upon the type of callback function. To execute the MDAV metadata in runtime, the MDAV metadata associated with an application server is received and transformed into an in-memory executable metadata, to generate an instance of an in-memory executable calculation scenario. The instance of the in-memory executable calculation scenario is analyzed to determine process callbacks associated with nodes of the in-memory executable calculation scenario. The runtime callback function is executed by executing a selection callback at the nodes and a transformation callback at part providers associated with the in-memory executable calculation scenario.

A selection callback allows the execution of the associated MDAV metadata at lower nodes of the in-memory executable calculation scenario. To execute the selection callback, the MDAV metadata is selected and filtered on a persistency layer, and further rendered for aggregations and transformations. Attributes or fields associated with a lower node may be different from the attributes or fields associated with a higher node. Thus, a mapping of the fields is provided along with the selection callback to map the fields of the lower node with the fields of the higher node. A filter is associated with each node of the in-memory executable calculation scenario, which stores filter conditions, and pushes these filter conditions to a lower node from a higher node. At a lower node, the filter conditions are processed to retrieve a resultant of the MDAV metadata from a higher node, and based upon the retrieved resultant, the runtime callback function is executed by executing the selection callback.

A transformation callback allows executing a callback function on an executed MDAV metadata. The transformation callback allows post-processing of the executed MDAV metadata, by calling back the MDAV metadata of a combination type of a calculation pattern associated with the in-memory executable calculation scenario. Subsets of the executed MDAV metadata are determined by determining part providers associated with the MDAV metadata. The MDAV metadata is analyzed to determine fields associated with the part provider. These fields are propagated from the part provider at a lower node of the in-memory executable calculation scenario to a higher node of the in-memory executable calculation scenario. The MDAV metadata is indexed to distinguish the propagated fields from the part providers. The subsets associated with the part provider are executed to execute the runtime callback function.

FIG. 1 is a block diagram illustrating an overall architecture of a system to execute a runtime callback function, according to an embodiment. System 100 includes OLAP processor 105, MDAV runtime module 110, runtime analyzer 115, combined MDAV runtime unit 120, compound MDAV runtime unit 125, basic MDAV runtime unit 130, MDAV metadata runtime buffer 135, in-memory runtime execution engine 140 and in-memory database 145. OLAP processor 105 is responsible for performing analytical processing of multidimensional data according to a business requirement. In an embodiment, in-memory database 145 includes many data sources that are involved in performing corresponding data operations. To execute the data available in runtime and provide OLAP processor 105 with a resultant of the execution MDAV runtime module 110 is configured to execute runtime callback functions during system runtime. In an embodiment, runtime module 110 is configured to execute a selection callback and a transformation callback. In an embodiment, basic MDAV runtime unit 130, compound MDAV runtime unit 125 and combined MDAV runtime unit 120 are associated with an analytical runtime execution engine (not shown in the figure).

Accordingly, in an embodiment, in-memory database 145 renders multidimensional metadata (MDAV metadata) associated with an application server to MDAV runtime module 110. Runtime analyzer 115 analyzes the MDAV metadata and transforms the MDAV metadata into an in-memory executable metadata, to generate an instance of an in-memory executable calculation scenario. Runtime analyzer 115 analyzes the instance of the in-memory executable calculation scenario and based upon the analysis, in-memory runtime execution engine 140 determines one or more process callbacks associated with one or more nodes of the in-memory executable calculation scenario. In-memory runtime execution engine 140 determines a type of the process callback, and executes the runtime callback function by executing a selection callback at the nodes of the in-memory executable calculation scenario and executing a transformation callback at part providers associated with the in-memory executable calculation scenario. A part provider is an MDAV instance which may include one or more MDAV instances, and provides data to the included MDAV instances. Each MDAV instance may provide a part of data, or subsets of a data to execute the transformation callback. In an embodiment, in-memory runtime execution engine 140 processes the selection callback to derive an associated filter condition to execute the selection callback and transform a resultant of the execution into an in-memory executable runtime callback function. Based upon the transformation, in-memory runtime execution engine 140 renders the resultant in a placeholder of a second calculation node. The resultant is stored in MDAV metadata runtime buffer 135. In-memory runtime execution engine 140 determines a trigger to execute the runtime callback function on a primary calculation node associated with the MDAV metadata. Based upon the trigger, in-memory runtime execution engine 140 instructs the in-memory computing engine to push the filter condition from the secondary calculation node to the primary calculation node. Further, in-memory runtime execution engine 140 retrieves the resultant form the placeholder to execute the runtime callback function at the primary calculation node.

In an embodiment, the primary calculation node of the in-memory executable calculation scenario may be a join view calculation node, and the secondary calculation node may be a projection calculation node associated with the in-memory executable calculation scenario. Accordingly, the transformed resultant is rendered in a projection view place holder of a projection view calculation node. The join view calculation node is executed by in-memory runtime execution engine 140, by extracting the filter condition from the projection view calculation node based upon a determination of a runtime calculation function associated with the join view calculation node. Further, in-memory runtime execution engine 140 processes the filter condition to retrieve the in-memory executable resultant from the projection view placeholder and executes the runtime callback function associated with the join view calculation node.

In another embodiment, runtime analyzer 115 analyzes the executed MDAV metadata to determine a combination type of a calculation pattern associated with the in-memory executable calculation scenario. Runtime analyzer 115 determines a part provider associated with the combination type of the calculation pattern to retrieve subsets associated with the instance of the in-memory executable calculation scenario. In-memory runtime execution engine 140 determines one or more fields associated with the part provider, and propagate the fields from the part provider at a lower node of the in-memory executable calculation scenario to a higher node of the in-memory executable calculation scenario by generating additional fields and indexing the MDAV metadata to distinguish the propagated fields of one or more part providers. In-memory runtime execution engine 140 executes a transformation callback by processing the subsets associated with the part provider, to further execute the callback function. In an embodiment, the fields associated with the part provider are propagated at a compile time of the computer.

Figure 2:
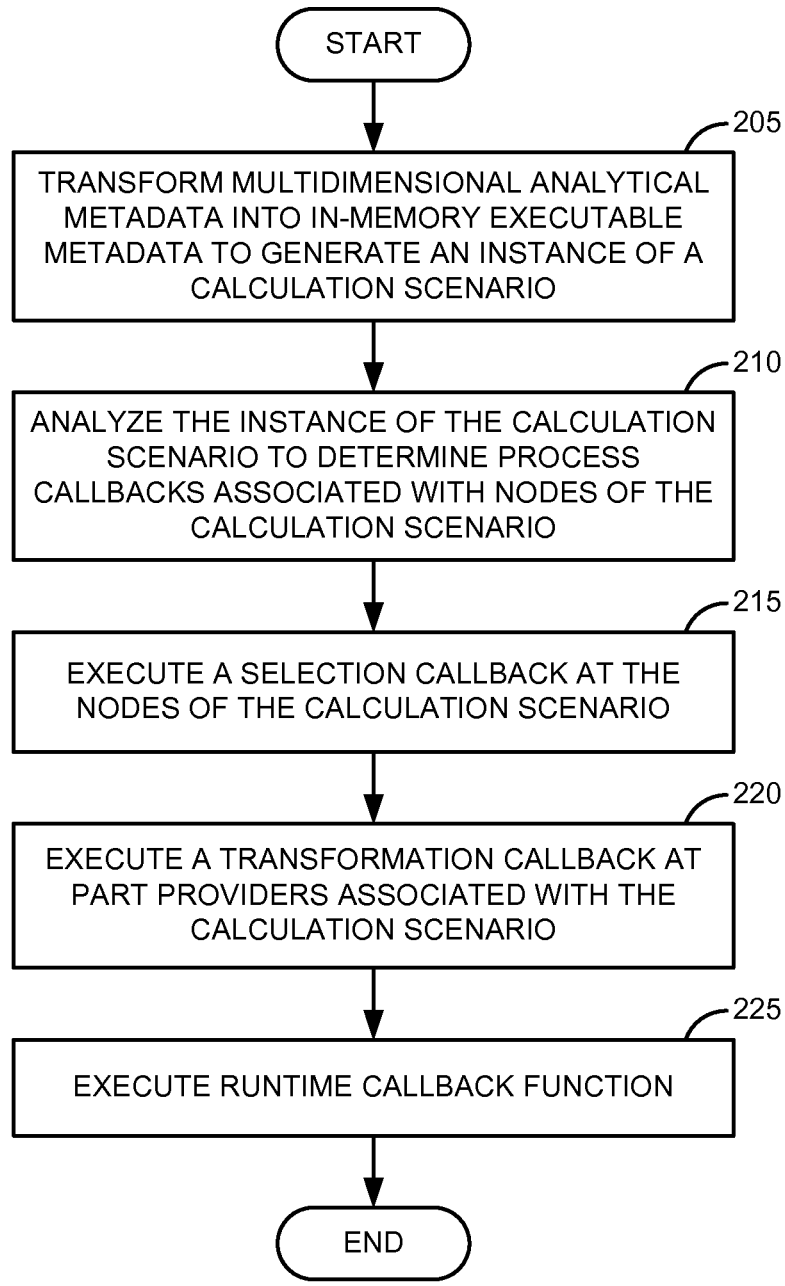
FIG. 2 is a process flow diagram illustrating a method to execute a runtime callback function, according to an embodiment.

FIG. 2 is a process flow diagram illustrating a method to execute a runtime callback function, according to an embodiment. In process block 205, multidimensional analytical metadata is transformed into in-memory executable metadata to generate an instance of an in-memory executable calculation scenario. In process block 210, the instance of the in-memory executable calculation scenario is analyzed to determine one or more process callbacks associated with one or more nodes of the in-memory executable calculation scenario. The process callbacks include but are not restricted to a selection callback and a transformation callback. Based upon a type of the process callback, the runtime callback function is executed by executing the process callback. In process block 215, a selection callback is executed at one or more nodes of the in-memory executable calculation scenario for a "selection" type of callback function occurrence. In process block 220, a transformation callback is executed at part providers associated with the in-memory executable calculation scenario for a "transformation" type of callback function occurrence. In process block 225, the runtime callback function is executed upon execution of the process callback.

Figure 3:
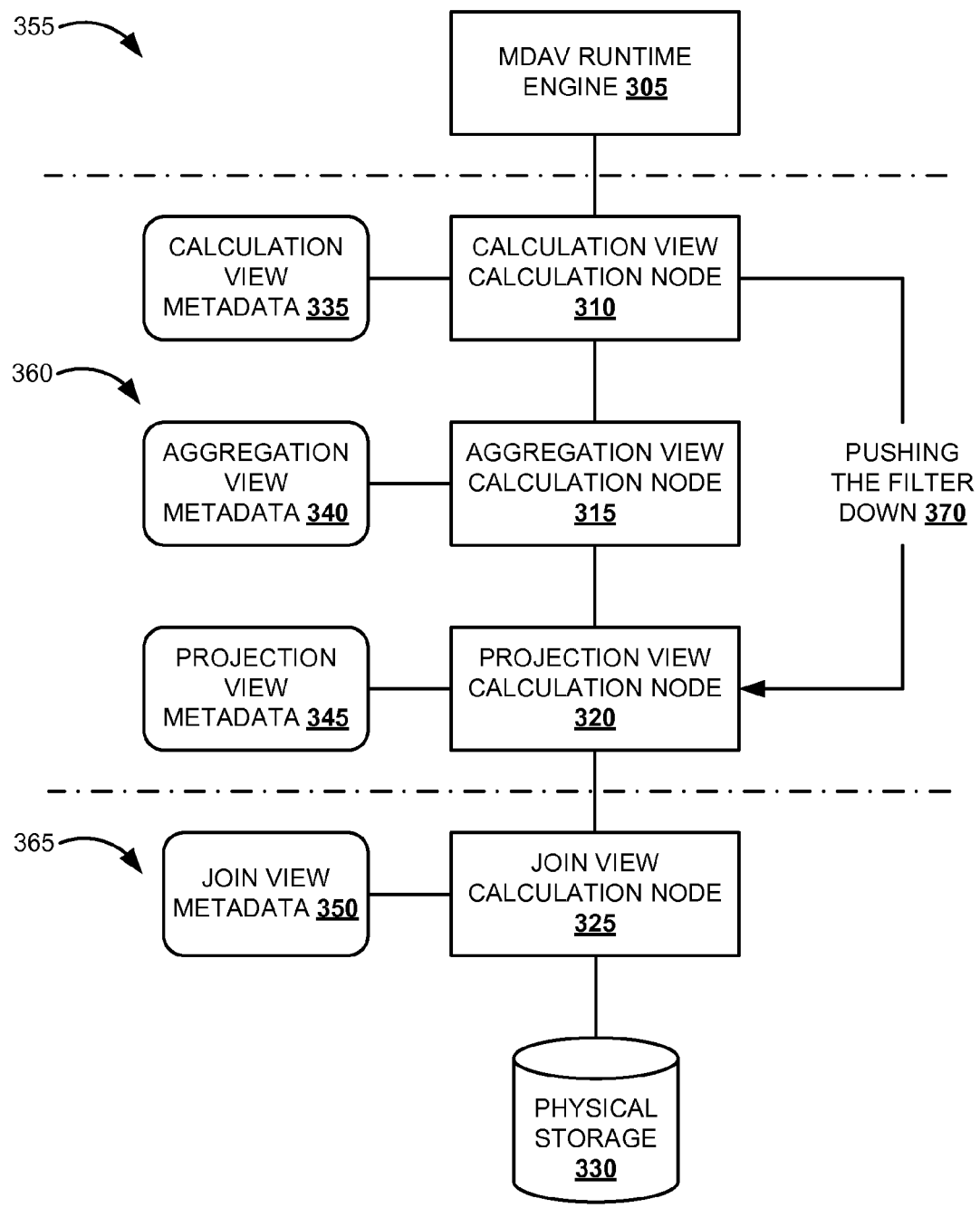
FIG. 3 is a block diagram illustrating a method to execute a selection callback, according to an embodiment.

FIG. 3 is a block diagram illustrating a method to execute a selection callback, according to an embodiment. A selection callback illustrates a process of determining a selection that needs to be executed. Selection callbacks may be described as a code that allows a secondary layer to call a function from a primary layer in a computer program. For instance, when a question is asked, based upon an answer, the process flow decides one of the two actions available and proceeds. For example, a logical condition: if-then-else illustrates a selection function, where if condition A is true, then action X is performed; else, action Y is performed. Similarly, a selection callback performs an action when it is encountered or selected in a data flow. A callback is typically a piece of code that is passed as an argument to another code. Hence, when a selection callback is encountered in a data flow, the process proceeds to executing an associated function. In an embodiment, selection callbacks may represent transformation rules for the MDAV metadata.

While executing the MDAV metadata, the selection callback is processed to derive a filter condition. Processing the selection callback includes determining one or more nodes associated with an instance in-memory executable calculation scenario that is generated while transforming the MDAV into an in-memory executable metadata. The nodes of the in-memory executable calculation scenario and/or the instance of the in-memory executable calculation scenario represent various stages through which the metadata flows to be executed at the in-memory computing engine. In an embodiment, the terms 'in-memory executable calculation scenario' and 'an instance of an in-memory executable calculation scenario' may be used interchangeably throughout the description. The nodes of the in-memory executable calculation scenario may include join view calculation node 325, projection view calculation node 320, aggregation view calculation node 315 and any other additional calculation view calculation node 310. Each node includes a corresponding processed metadata, where the metadata from a previous node is taken as an input to a current node and processed to generate an output of the current node. For instance, join view metadata 350 is the processed metadata that is retrieved from physical storage 330 and processed at join view calculation node 325. Similarly, projection view metadata 345, aggregation view metadata 340, and calculation view metadata 335 represent the corresponding metadata at the nodes of the in-memory executable calculation scenario 320, 315 and 310 respectively.

Based upon the determined nodes associated with the in-memory executable calculation scenario, the selection callback associated with an application server is processed to derive a filter condition associated with the application server. The filter condition is a filter rule that is associated with a filter. A filter condition facilitates in filtering one or more sections (for e.g. fields of a table) of the MDAV metadata that are not necessary for runtime execution. Each node of the in-memory executable calculation scenario is configured to include a filter that persists one or more filter conditions and pushes these filter conditions to a lower calculation node from a higher calculation node. The filter conditions are generated by converting the metadata associated with the selection callback on the application server. The filter conditions are pushed from a higher node of the in-memory executable calculation scenario to a lower node to perform an analytical execution of the runtime callback function. The MDAV metadata is executed at an in-memory computing engine runtime, and in an embodiment, a sequence of various steps that is processed to execute the MDAV metadata is represented as 355. Similarly, a sequence of steps processed at an in-memory runtime node is represented as 360, and a sequence of steps processed at a metadata determination node is represented as 365. In an embodiment, 355 represents a final calculation view of the MDAV runtime execution, 360 represents a secondary calculation view of the MDAV runtime execution, and 365 represents a primary calculation view of the MDAV runtime execution.

The selection callback is executed in the application server at a system runtime to generate a resultant of the execution. This resultant is transformed into an in-memory executable runtime callback function and is rendered in a placeholder of a secondary calculation node (e.g. projection view calculation node 320). Based upon a trigger to execute the runtime callback function on a primary calculation node (e.g. join view calculation node 325); the in-memory computing engine pushes the filter condition (at 370) to the primary calculation node. The in-memory computing engine extracts the filter condition from the secondary calculation node and retrieves the transformed resultant from the placeholder in secondary calculation node. Further, the in-memory computing engine implements the resultant to execute the runtime callback function.

In an embodiment, executing the runtime callback includes executing the in-memory executable calculation scenario. To execute the in-memory executable calculation scenario, the selection callbacks of the application server are processed at MDAV runtime engine 305 to derive the filter conditions associated with the application server. The selection callbacks are executed to transform the resultant of the execution into in-memory executable runtime callback function and rendered in a projection view calculation placeholder at projection view calculation node 320. Further, join view calculation node 325 is executed by extracting the filter condition from projection calculation view place holder based upon a determination of a runtime callback function associated with join view calculation node 325. The filter conditions are processed to retrieve an in-memory executable resultant associated with the selection callback from the projection view placeholder. The runtime callback function associated with join view calculation node 325 is executed at 365.

In an embodiment, executing the in-memory executable calculation scenario includes executing join view calculation node 325. Runtime functions associated with join view calculation node 325 are analyzed, and based upon a determination of a runtime callback function associated with join view calculation node 325, the filter conditions are extracted from projection view calculation node 320. The in-memory executable resultant of an execution of the selection callback is retrieved from the projection view placeholder and the selection callback associated with join view calculation node 325 is executed.

In an embodiment, a relationship map of the filter condition and the transformed resultant stored in a placeholder is persisted in a persistent layer (denoted by 360). Based upon a trigger to execute the runtime callback function, the relationship map is retrieved to extract the transformed resultant, and execute the runtime callback function.

Figure 4:
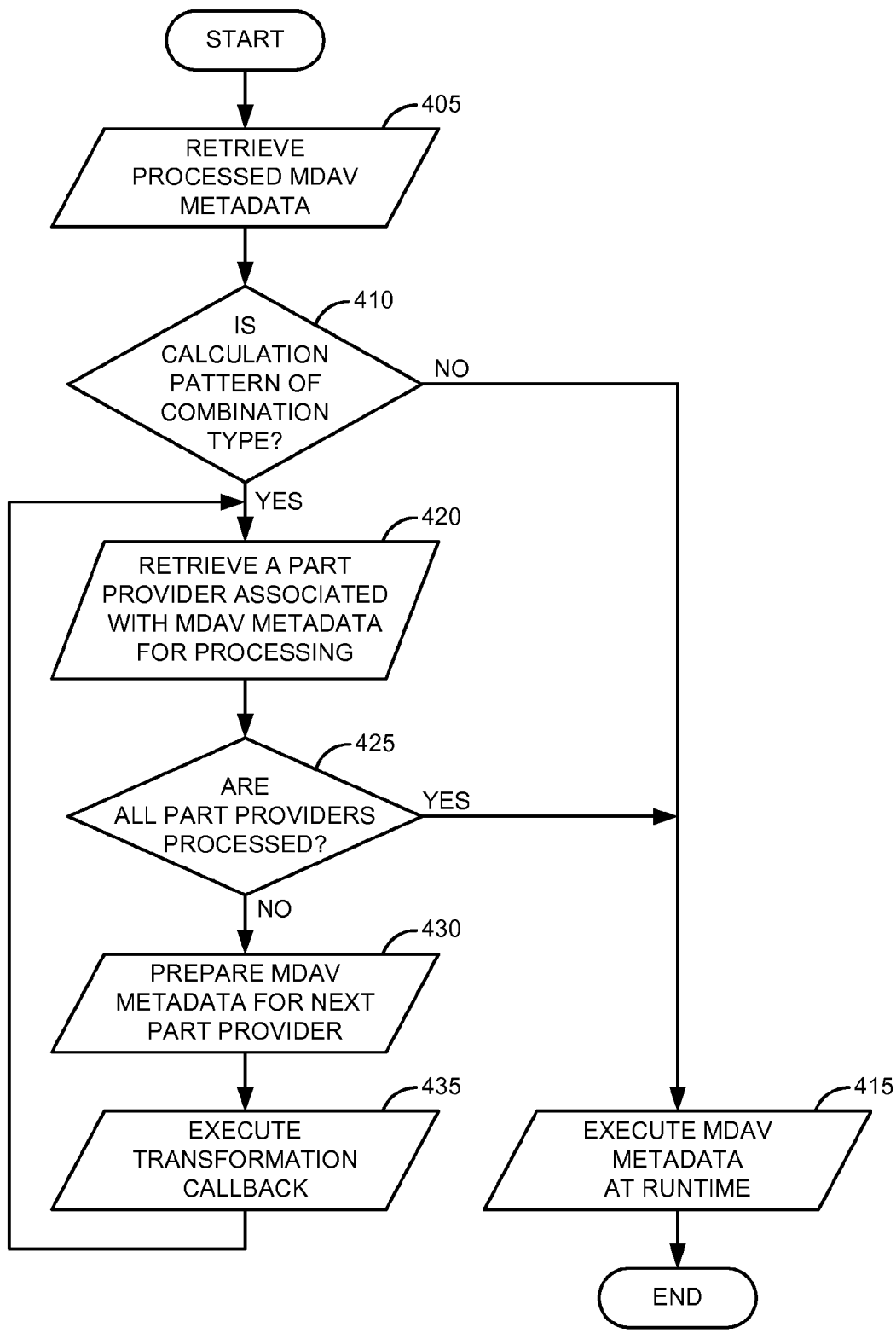
FIG. 4 is a functional flow diagram illustrating a method to execute transformation callback, according to an embodiment.

FIG. 4 is a functional flow diagram illustrating a method to execute a transformation callback, according to an embodiment. A transformation callback includes post-processing a MDAV metadata by calling back the MDAV metadata of a combination type of a calculation pattern associated with the instance of the in-memory executable calculation scenario. For instance, consider a union type of calculation pattern being executed in the in-memory executable calculation scenario associated with the in-memory computing engine, and while executing the calculation pattern, the in-memory computing engine encounters a transformation callback. This transformation callback is executed on the executed MDAV metadata (following an execution of the union type of calculation pattern), and thus represents a post-processing manner of executing the transformation callback. Subsets of the combination type of the calculation pattern are determined by determining one or more part providers associated with the MDAV metadata. The part provider retrieves one or more subsets associated with the instance of the in-memory executable calculation scenario. The transformation callback is executed by processing the subsets associated with the part provider, to execute the runtime callback function.

The transformation callback is executed in two parts: a MDAV metadata determination process and an MDAV runtime execution process. During the MDAV metadata determination process, the MDAV metadata associated with the combination type (for e.g. a UNION type) is prepared to get relevant information for deployment of the MDAV metadata in the in-memory computing engine. To prepare the MDAV metadata, one or more fields associated with attributes of the MDAV metadata that are required to execute a runtime callback function are determined. The MDAV metadata is traversed recursively from a root level of the calculation node to determine one or more dependencies or subsets of the MDAV metadata. The fields that are relevant to execute the runtime callback function are propagated from the part provider to a top level of the calculation node, by creating additional fields in the top level of the calculation node and aliasing the fields in the top level. If a conflict arises while aliasing the names of the fields associated with the root level for the fields associated with the top level of the calculation node, different names may be used and mapping information between the fields at the root level and the fields at the top level may be stored in the MDAV metadata. An MDAV name attribute may be used to distinguish the data coming from separate data providers.

Further, the MDAV metadata is executed at runtime by associating one or more parameters with the MDAV metadata. The parameters associated with metadata are utilized to determine a resultant of the execution, by executing the associated transformation callback. For instance, consider a UNION type of calculation pattern that includes two basic MDAV metadata M1 and M2. If the transformation callback is defined on part provider associated with M1, the transformation callback is executed on the part provider B1 by utilizing the associated parameters. The transformation callback is executed by post-processing the MDAV metadata associated with the combination type of calculation pattern associated with the in-memory executable calculation scenario. To ensure a consistency in executing all the subsets of the MDAV metadata, a top-down approach of executing a hierarchy in which the MDAV metadata exists, is followed. For instance, a top node is executed to retrieve one or more part providers and corresponding subsets. If one or more part providers are associated with a combination type of calculation pattern, each part provider is retrieved and processed. On completion of the processing of each part provider, the MDAV metadata is prepared for processing the next part provider based upon a result of the previous execution. Based upon the MDAV metadata, the runtime callback function associated with the subsets of the MDAV metadata is executed. Upon completion of executing all the part providers, the process proceeds to execute the runtime callback function in a calculation engine associated with the in-memory computing engine. Thus, the post-processing of the MDAV metadata is executed by retrieving the MDAV metadata of an executed calculation pattern associated with an in-memory executable calculation scenario and analyzing all the part providers and associated subsets of the MDAV metadata by breaking down and moving into a granular level in the hierarchy of the MDAV metadata.

Accordingly, at functional block 405 the processed MDAV metadata is retrieved from the in-memory computing engine for post-processing of one or more transformation process callbacks associated with the MDAV metadata. At decision block 410, a determination is established whether the calculation pattern associated with the MDAV metadata is of a combination type or not. If the calculation pattern is not of a combination type, the process proceeds to functional block 415 where the MDAV metadata is executed. If the calculation pattern is of a combination type, the process proceeds to functional block 420. At functional block 420, a part provider associated with the MDAV metadata is retrieved for processing. At decision block 425, a determination is established whether all the part providers associated with the MDAV metadata are processed. If all the part providers are processed, the process proceeds to functional block 415 where the MDAV metadata is executed. If all the part providers are not processed, the process proceeds to functional block 430 where the MDAV metadata is prepared for a next part provider. Further, in functional block 435, the transformation callback is executed and the process proceeds to retrieve a next part provider at functional block 420. A recursive determination of part providers and execution of the callback function associated with the MDAV metadata is executed until all the part providers are processed. Once all the part providers associated with the MDAV metadata are processed, the process proceeds to functional block 415 where the MDAV metadata is executed. Thus, a recursive callback execution is performed to execute all the subsets of the MDAV metadata until the root node of the in-memory executable calculation scenario. In an embodiment, the transformation process runtime callback function is executed as an out-of-order callback execution, where subsets of the MDAV metadata are analyzed and an order of execution of the MDAV metadata subsets is modified to manage the execution of the MDAV metadata in the in-memory computing engine.

For instance, consider a UNION type of a calculation pattern associated with an in-memory executable calculation scenario of DETERMINING EMPLOYEES' DATA IN AN ENTERPRISE. The UNION type includes one or more other types of dependent calculation patterns associated. Here, consider three BASIC types of calculation patterns associated with the UNION type, namely: HEADCOUNT OF EMPLOYEES, EMPLOYEES' PLANNED WORKING TIMES and EMPLOYEES' RECORDED WORKING TIMES. The determination of EMPLOYEES' PLANNED WORKING may include processing of a number of hours committed by each employee at a start date of project, a project identifier, a task identifier, and the like. The determination of EMPLOYEES' RECORDED WORKING TIMES may include processing of an actual start date, an actual end date, a project identifier, a task identifier, a total number of hours worked on the project and the like. The determination of HEADCOUNT OF EMPLOYEES may include determining an employee identifier of each of the employees associated with the project, a date of birth of each employee, an age of each employee, a length of service of each employee, a hire data of each employee, and the like.

While executing the MDAV metadata of determining EMPLOYEES' DATA IN AN ENTERPRISE at runtime, a runtime callback function may be encountered. For instance, to determine an employee's age, an additional determination of a date of birth, a current date, and a resultant age needs to be calculated. A transformation callback determines the subsets including an input to the employees' data of birth, an input to a current date. Based upon processing both of the subsets, an output of the age of the employee is generated. Once all the subsets associated with the BASIC type of calculation pattern are executed, the runtime callback function is executed and the process proceeds to executing the MDAV metadata at runtime.

Figure 5:
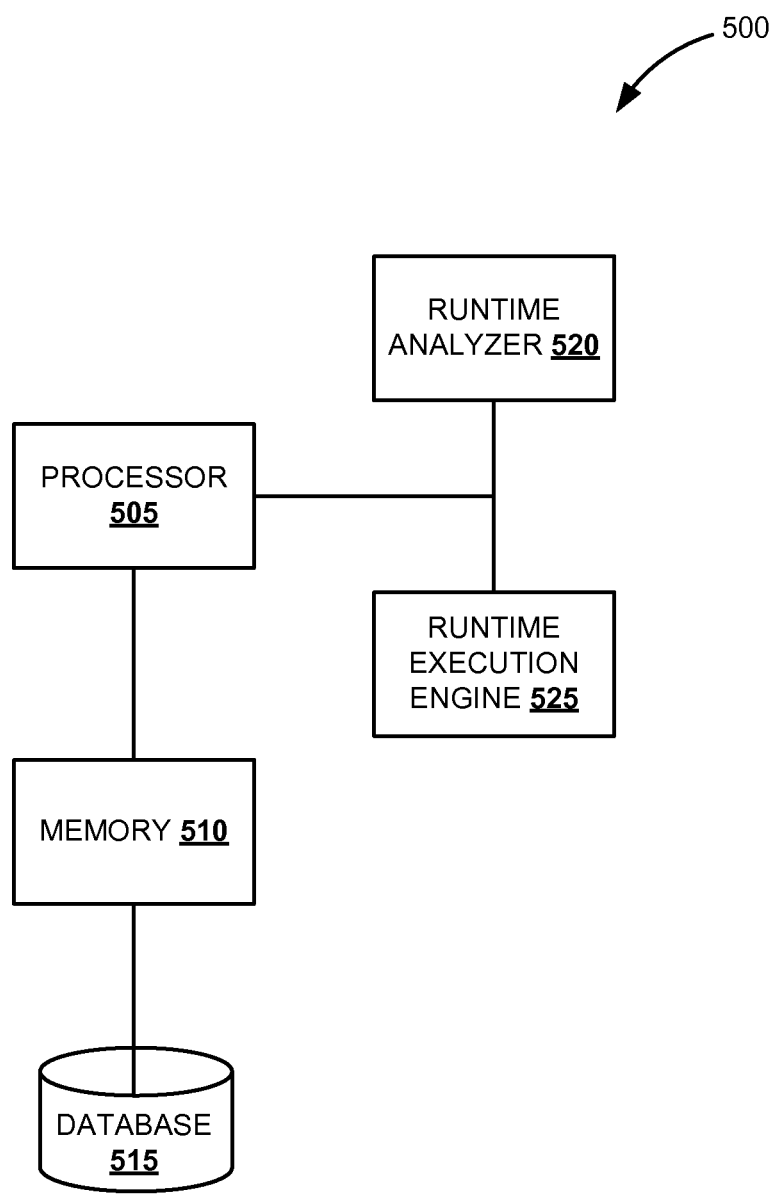
FIG. 5 is a block diagram illustrating a system to execute a runtime callback function, according to an embodiment.

FIG. 5 is a block diagram illustrating a system to execute a runtime callback function, according to an embodiment. System 500 includes processor 505, memory 510, database 515, runtime analyzer 520, and runtime execution engine 525. In an embodiment, processor 505 is in communication with memory 510 and database 515. Processor 505 reads and executes instructions that are stored in memory elements 510. Memory elements 510 store the instructions to analyze a plurality of representations of business data. Processor 505 is also in communication with runtime analyzer 520 and runtime execution engine 525.

In an embodiment, processor 505 is triggered by a user or by the computer system to initiate an execution of a runtime callback function. Processor 505 receives the MDAV metadata associated with an application server and sends it to runtime analyzer 520. Runtime analyzer 520 analyzes the MDAV metadata and transforms the MDAV metadata into in-memory executable metadata to generate an instance of an in-memory executable calculation scenario. Runtime analyzer 520 analyzes the instance of the in-memory executable calculation scenario to determine process callback associated with one or more nodes of the in-memory executable calculation scenario. Runtime execution engine 525 executes the runtime callback function by executing a selection callback at the nodes of the in-memory executable calculation scenario and executing a transformation callback at part providers associated with the in-memory executable calculation scenario.

In an embodiment, runtime analyzer 520 processes the selection callback associated with an application server to derive the filter conditions associated with the application server. Runtime execution engine 525 executes the selection callback in the application server at a system runtime to transform a resultant of the execution into an in-memory executable runtime callback function. Processor 505 renders the transformed resultant in a placeholder of a secondary calculation node associated with an in-memory computing engine. Based upon a trigger to execute the runtime callback function on a primary calculation node, runtime execution engine 525 pushes the filter condition to the primary calculation node to retrieve the resultant from the placeholder of the secondary calculation node and execute the runtime callback function.

In another embodiment, runtime analyzer 520 determines a query executed in the in-memory computing engine, and analyzes the MDAV metadata to determine a combination type of a calculation pattern associated with the instance of the in-memory executable calculation scenario. Runtime analyzer 520 determines a part provider associated with the combination type of the calculation pattern to retrieve subsets associated with the instance of the in-memory executable calculation scenario. Runtime execution engine 525 executes the transformation callback by processing the subsets associated with the part provider to execute the runtime callback function.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 6:
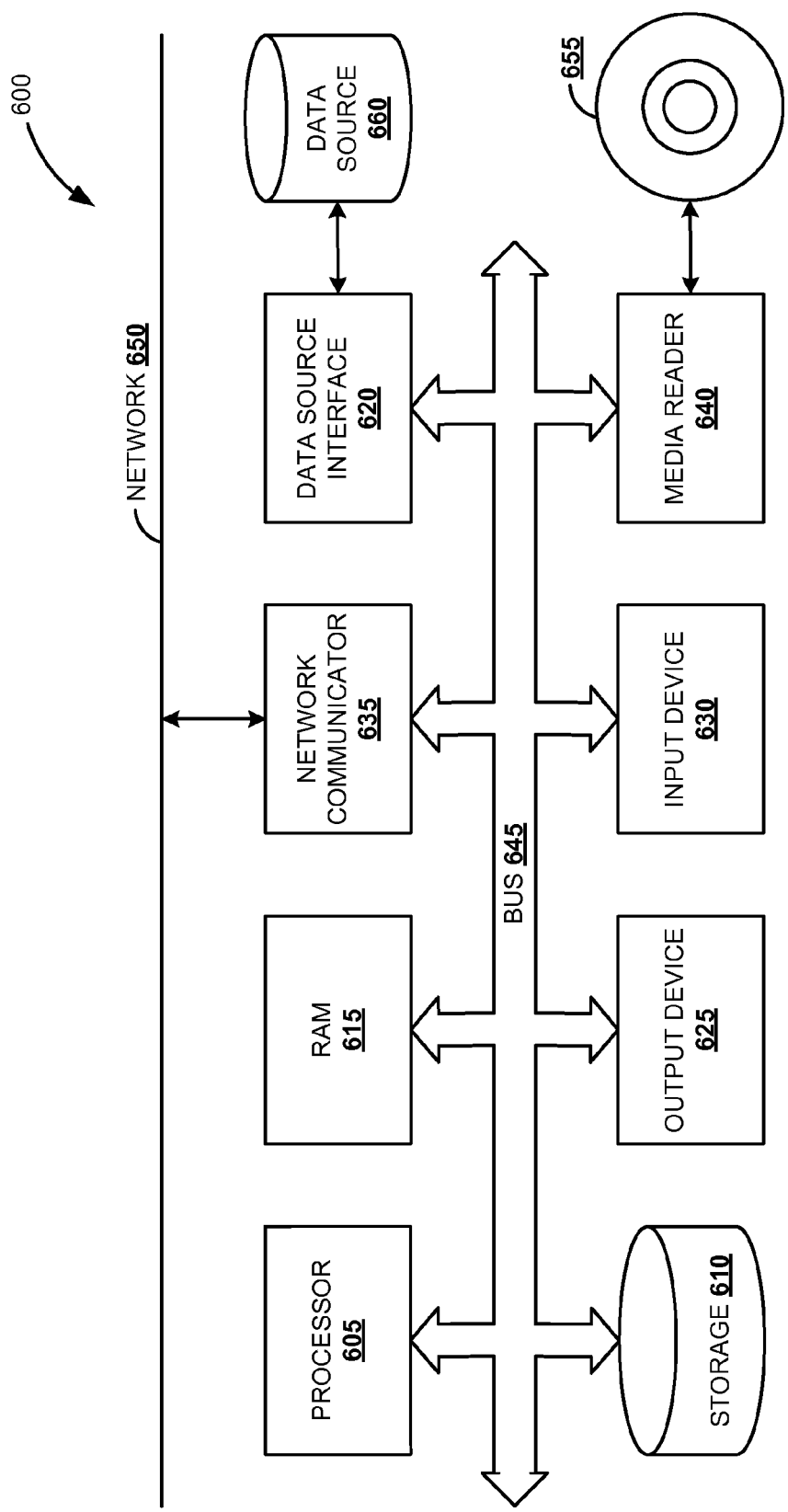
FIG. 6 is a block diagram illustrating a system, according to an embodiment.

FIG. 6 is a block diagram of an exemplary computer system 600. The computer system 600 includes a processor 605 that executes software instructions or code stored on a computer readable storage medium 655 to perform the above-illustrated methods of the invention. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment of the invention, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, continuation servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transaction, hierarchical, multi-dimensional (e.g., OLAP), object oriented databases, and the like. Further data sources include tabular data (e.g., spreadsheets, delimited text files), data tagged with a markup language (e.g., XML data), transaction data, unstructured data (e.g., text files, screen scrapings), hierarchical data (e.g., data in a file system, XML data), files, a plurality of reports, and any other data source accessible through an established protocol, such as, Open Data-Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated. The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer implemented method to execute a runtime callback function, comprising:
    transforming multidimensional analytical metadata associated with an application server into an in-memory executable metadata, to generate an instance of an in-memory executable calculation scenario;
    analyzing the instance of the in-memory executable calculation scenario to determine one or more process callbacks associated with a plurality of nodes of the in-memory executable calculation scenario; and
    based upon the determined one or more process callbacks, a processor of a computer executing the runtime callback function by
        executing a selection callback at the plurality of nodes of the in-memory executable calculation scenario, including:
            deriving a filter condition associated with the application server and executing the selection callback at a system runtime to generate a resultant; and
            transforming the resultant into an in-memory executable runtime callback function, and
        executing a transformation callback at one or more part providers associated with the in-memory executable calculation scenario, including:
            based upon an executed query, determining an associated calculation pattern, and
            determining a part provider associated with the calculation pattern to retrieve one or more associated subsets for processing.

2. The computer implemented method of claim 1 further comprises:
    based upon the transformation, a processor of the computer rendering the resultant in a placeholder of a secondary calculation node from the plurality of the nodes associated with an in-memory computing engine;
    based upon a trigger to execute the runtime callback function on a primary calculation node from the plurality of the nodes, the in-memory computing engine pushing the filter condition to the primary calculation node;
    extracting the filter condition from the secondary calculation node; and
    retrieving the resultant from the placeholder to execute the runtime callback function.

3. The computer implemented method of claim 2, further comprises: executing the in-memory executable calculation scenario by:
    processing the selection callback of the application server to derive the filter condition associated with the application server;
    executing the selection callback in the application server to transform the resultant of the execution into the in-memory executable runtime callback function;
    rendering the transformed resultant in a projection view placeholder of a projection view calculation node; and
    executing a join view calculation node by
        extracting the filter condition from the projection view calculation node based upon a determination of a runtime callback function associated with the join view calculation node;
        processing the filter condition to retrieve an in-memory executable resultant associated with the selection callback from the projection view placeholder; and
        executing the runtime callback function associated with the join view calculation node.

4. The computer implemented method of claim 1, wherein executing the in-memory executable calculation scenario comprises:
    executing a join view calculation node by
        analyzing one or more runtime functions associated with the join view calculation node;
        based upon a determination of a runtime callback function associated with the join view, extracting the filter condition from the projection view calculation node;
        retrieving an in-memory executable resultant of an execution of a selection callback from a projection view placeholder; and executing the runtime callback function associated with the join view.

5. The computer implemented method of claim 2, wherein executing the runtime callback function includes: executing an in-memory executable calculation scenario based upon the selection callback, the in-memory executable calculation scenario including the primary calculation node and the secondary calculation node.

6. The computer implemented method of claim 2 further comprising: executing the runtime callback function at the primary calculation node associated with the in-memory executable calculation scenario by:
   determining a query to execute the runtime callback function at the primary calculation node;
   based upon the query, extracting the filter condition from the secondary calculation node to retrieve the transformed resultant in the placeholder of the secondary node; and
   implementing the resultant and executing the runtime callback function.

7. The computer implemented method of claim 2, wherein executing the runtime callback function comprises:
   persisting a relationship map of the filter condition and the transformed resultant stored in the placeholder in a persistent layer;
   based upon a trigger to execute the runtime callback function, retrieving the relationship map to extract the transformed resultant; and
   executing the runtime callback function.

8. The computer implemented method of claim 2, wherein pushing the filter condition includes: pushing the filter condition from a higher node of an in-memory executable calculation scenario to a lower node of the in-memory executable calculation scenario to perform an analytical execution of the runtime callback function.

9. The computer implemented method of claim 2 further comprising: associating one or more filters to one or more calculation nodes of the in-memory executable calculation scenario to:
   persist one or more filter conditions; and
   based on a determination of the runtime callback function, push the filter condition to a lower calculation node from a higher calculation node.

10. The computer implemented method of claim 2 further comprising: implementing a conversion function on the application server to convert metadata associated with the selection callback into the filter conditions.

11. The computer implemented method of claim 1, wherein executing the transformation callback further comprises:
   based upon a query executed in the in-memory computing engine, analyzing the multidimensional analytical metadata to determine a combination type of a calculation pattern associated with the instance of the in-memory executable calculation scenario;
   determining a part provider associated with the combination type of the calculation pattern to retrieve one or more subsets associated with the instance of the in-memory executable calculation scenario; and
   executing the transformation callback by processing the subsets associated with the part provider to execute the runtime callback function.

12. The computer implemented method of claim 11, wherein analyzing the multidimensional analytical metadata comprises:
   determining one or more fields associated with the part provider to execute the transformation callback;
   propagating the fields from the part provider at a lower node of the in-memory executable calculation scenario to a higher node of the in-memory executable calculation scenario by generating additional fields associated with the execution of the transformation callback; and
   indexing the multidimensional analytical metadata to distinguish the propagated fields from one or more part providers.

13. The computer implemented method of claim 11, wherein executing the transformation callback comprises: post-processing the multidimensional analytical metadata based upon the query executed in the in-memory computing engine.

14. The computer implemented method of claim 11, wherein executing the transformation callback comprises executing the callback function from a lower node of the in-memory executable calculation scenario to a higher node of the in-memory executable calculation scenario by recursively traversing the combination type of the calculation pattern associated with the multidimensional metadata associated with the in-memory executable calculation scenario.

15. The computer implemented method of claim 14, wherein recursively traversing the combination type includes: determining one or more part providers associated with the combination type of the calculation pattern.

16. The computer implemented method of claim 11, wherein executing the transformation callback comprises executing an out of order callback function for the combination type of the calculation pattern associated with the multidimensional analytical metadata.

17. An article of manufacture including a non-transitory computer readable storage medium to tangibly store instructions, which when executed by a computer, cause the computer to:
   transform multidimensional analytical metadata associated with an application server into an in-memory executable metadata, to generate an instance of the in-memory executable calculation scenario;
   analyze the instance of the in-memory executable calculation scenario to determine one or more process callbacks associated with a plurality of nodes of the in-memory executable calculation scenario; and
   based upon the determined one or more process callbacks, execute a runtime callback function by
      executing a selection callback at the plurality of nodes of the in-memory executable calculation scenario including:
         deriving a filter condition associated with the application server and executing the selection callback at a system runtime to generate a resultant; and
         transforming the resultant into an in-memory executable runtime callback function, and
      executing a transformation callback at one or more part providers associated with the in-memory executable calculation scenario including:
         based upon an executed query, determining an associated calculation pattern, and
         determining a part provider associated with the calculation pattern to retrieve one or more associated subsets for processing.

18. The article of manufacture of claim 17 further comprises:
   a processor of the computer rendering the resultant in a placeholder of a secondary calculation node from the plurality of the nodes associated with an in-memory computing engine;

based upon a trigger to execute the runtime callback function on a primary calculation node from the plurality of the nodes, the in-memory computing engine pushing the filter condition to the primary calculation node;

extracting the filter condition from the secondary calculation node; and retrieving the resultant from the placeholder to execute the runtime callback function.

19. The article of manufacture of claim 17, wherein executing the transformation callback further comprises:

analyzing the multidimensional analytical metadata to determine a combination type of a calculation pattern associated with the instance of the in-memory executable calculation scenario;

determining a part provider associated with the combination type of the calculation pattern to retrieve one or more subsets associated with the instance of the in-memory executable calculation scenario;

executing the transformation callback by processing the subsets associated with the part provider to execute the runtime callback function.

20. A computing system to execute a runtime callback function, comprising:

a processor to read and execute instructions stored in one or more memory elements; and the one or more memory elements storing instructions related to:

a runtime analyzer to transform the multidimensional analytical metadata associated with an application server into an in-memory executable metadata, to generate an instance of the in-memory executable calculation scenario, and to analyze the instance of the in-memory executable calculation scenario to determine one or more process callbacks associated with a plurality of nodes of the in-memory executable calculation scenario; and a runtime execution engine to execute the runtime callback function by executing a selection callback at the plurality of nodes of the in-memory executable calculation scenario including: deriving a filter condition associated with the application server and executing the selection callback at a system runtime to generate a resultant, and transforming the resultant into an in-memory executable runtime callback function, and executing a transformation callback at one or more part providers associated with the in-memory executable calculation scenario including: based upon an executed query, determining an associated calculation pattern, and determining a part provider associated with the calculation pattern to retrieve one or more associated subsets for processing.

* * * * *